(12) United States Patent
Schmidhammer (10) Patent No.: US 9,929,751 B2
(45) Date of Patent: Mar. 27, 2018

(54) MOBILE TRANSCEIVER WITH SHARED USER FILTER, METHOD FOR THE OPERATION OF THE MOBILE TRANSCEIVER AND USE OF A FILTER

(71) Applicant: SNAPTRACK, INC., San Diego, CA (US)

(72) Inventor: Edgar Schmidhammer, Stein an der Traun (DE)

(73) Assignee: SnapTrack, Inc., San Diego, CA (US)

( * ) Notice: Subject to any disclaimer, the term of this patent is extended or adjusted under 35 U.S.C. 154(b) by 0 days.

(21) Appl. No.: 14/894,275

(22) PCT Filed: May 5, 2014

(86) PCT No.: PCT/EP2014/059084
§ 371 (c)(1),
(2) Date: Nov. 25, 2015

(87) PCT Pub. No.: WO2014/198457
PCT Pub. Date: Dec. 18, 2014

(65) Prior Publication Data
US 2016/0134308 A1   May 12, 2016

(30) Foreign Application Priority Data
Jun. 10, 2013 (DE) .................. 10 2013 105 999

(51) Int. Cl.
*H04B 1/00* (2006.01)
*H04L 5/14* (2006.01)
(Continued)

(52) U.S. Cl.
CPC ............... *H04B 1/005* (2013.01); *H04B 1/18* (2013.01); *H04B 1/401* (2013.01); *H04L 5/14* (2013.01)

(58) Field of Classification Search
CPC . H04B 1/00; H04B 1/005; H04B 1/18; H04B 1/40; H04B 1/401; H04L 5/14
See application file for complete search history.

(56) References Cited

U.S. PATENT DOCUMENTS 6,185,434 B1 * 2/2001 Hagstrom ............. H01P 1/2136
370/272
7,142,884 B2 * 11/2006 Hagn ..................... H04B 1/005
455/552.1
(Continued)

FOREIGN PATENT DOCUMENTS

DE          10053205 A1    5/2002
EP          1684438 A2     7/2006
(Continued)

OTHER PUBLICATIONS

International Search Report and Written Opinion—PCT/EP2014/059084—ISA/EPO—dated Sep. 10, 2014.

*Primary Examiner* — Tri H Phan
(74) *Attorney, Agent, or Firm* — Patterson & Sheridan, L.L.P.

(57) ABSTRACT

A mobile communication device includes an antenna and a transceiver circuit having a first port for transmitting first RF signals and a second port for transmitting second RF signals. The second RF signals are different than the first RF signals. A single RF filter is electrically connected between the antenna and the transceiver circuit. The RF filter has an antenna port coupled to the antenna and a transceiver port coupled to the transceiver circuit. The transceiver port of the RF filter is coupled to the first port and to the second port of the transceiver circuit.

20 Claims, 4 Drawing Sheets (51) Int. Cl.
*H04B 1/401* (2015.01)
*H04B 1/18* (2006.01)

(56) References Cited

U.S. PATENT DOCUMENTS

| | | | | |
|---|---|---|---|---|
| 7,443,810 | B2* | 10/2008 | Boyle | H01Q 1/243 |
| | | | | 343/700 MS |
| 7,546,091 | B2* | 6/2009 | Murakami | H03H 7/38 |
| | | | | 333/100 |
| 9,319,214 | B2* | 4/2016 | Khlat | H04L 5/18 |
| 9,337,991 | B2* | 5/2016 | Ali-Ahmad | H04L 5/18 |
| 2007/0190954 | A1 | 8/2007 | Murakami et al. | |
| 2007/0238483 | A1 | 10/2007 | Boireau et al. | |
| 2008/0080453 | A1* | 4/2008 | Rofougaran | H04B 1/005 |
| | | | | 370/342 |
| 2010/0210208 | A1 | 8/2010 | Gorbachov | |
| 2011/0128092 | A1* | 6/2011 | Fritz | H03H 9/706 |
| | | | | 333/133 |
| 2013/0234806 | A1* | 9/2013 | Schmidhammer | H01P 1/213 |
| | | | | 333/133 |
| 2014/0113574 | A1* | 4/2014 | Schmidhammer | H04B 1/48 |
| | | | | 455/78 |
| 2014/0233441 | A1* | 8/2014 | Lee | H03H 7/463 |
| | | | | 370/297 |
| 2014/0334362 | A1* | 11/2014 | Granger-Jones | H04L 5/08 |
| | | | | 370/297 |
| 2016/0056945 | A1* | 2/2016 | Ella | H04B 1/525 |
| | | | | 370/273 |
| 2017/0244538 | A1* | 8/2017 | Chang | H04L 5/14 |

FOREIGN PATENT DOCUMENTS

| | | |
|---|---|---|
| JP | H06507768 A | 9/1994 |
| WO | 9606490 A1 | 2/1996 |

* cited by examiner

MOBILE TRANSCEIVER WITH SHARED USER FILTER, METHOD FOR THE OPERATION OF THE MOBILE TRANSCEIVER AND USE OF A FILTER

This patent application is a national phase filing under section 371 of PCT/EP2014/059084, filed May 5, 2014, which claims the priority of German patent application 10 2013 105 999.6, filed Jun. 10, 2013, each of which is incorporated herein by reference in its entirety.

TECHNICAL FIELD

The invention relates to a mobile communication device with a commonly used filter, a method for operating the mobile communication device and the use of a filter.

BACKGROUND

The frequency range that is reserved worldwide for mobile communication systems comprises many frequency bands. There are a multiplicity of different mobile communication standards and many duplexing methods that a modern mobile communication device needs to be able to use in order to be competitive. At the same time, there is the trend toward ever more advanced miniaturization of electrical components that are installed in mobile communication devices and that use the standards and duplexing methods.

Usual mobile communication standards in Europe are GSM (Global System for Mobile communication) and UMTS (Universal Mobile Telecommunications Systems). Popular duplexing methods are FDD (Frequency Division Duplexing) methods, which involve transmitted and received signals being transmitted simultaneously in principle, but on different frequencies, TDD (Time Division Duplexing) methods, which involve transmitted and received signals being transmitted alternately in successive timeslots, and the duplexing method of the GSM standard, which involves transmitted and received signals being transmitted both on different frequencies and successively in timeslots.

Although the design is meant to be as small as possible, a mobile communication device can therefore easily have ten or more RF filters, even if, e.g., German patent document DE 100 53 205 A1, also published as counterpart U.S. Pat. No. 7,142,884 B2, discloses measures for integrating circuit elements for multiband and/or multimode operation.

The consequences of these contrary trends are an ever greater risk from crosstalk, i.e., the coupling of interfering signals on one signal path into another signal path, and higher costs as a result of more complex circuitry.

SUMMARY

The invention relates to mobile communication devices having an RF filter that is used for at least two different modes of operation. The invention additionally relates to methods for operating a mobile communication device and to the use of an RF filter for at least two different modes of operation.

Embodiments of the invention specify a mobile communication device that is compatible with popular mobile communication standards and duplexing methods but has lower complexity than known devices and therefore operates with less susceptibility to interference and is cheaper to manufacture. Additional embodiments specify a method for operating such a mobile communication device.

A mobile communication device comprises an antenna, a transceiver circuit and an RF filter electrically connected between the antenna and the transceiver circuit. The transceiver circuit has a first port for transmitting first RF signals and a second port for transmitting second RF signals. In this case, the second RF signals are different than the first RF signals. The RF filter has an antenna port, which is coupled to the antenna, and a transceiver port, which is coupled to the transceiver circuit. The transceiver port of the RF filter is coupled to the first port and to the second port of the transceiver circuit.

In this case, the antenna is used for sending or receiving RF signals. The transceiver circuit can comprise circuit components such as power amplifiers, which are electrically connected in appropriate transmitted signal paths, and low noise amplifiers, which can be electrically connected in received signal paths. The RF filter is part of the front end circuit that connects the antenna or possibly a plurality of antennas of the mobile communication device to corresponding ports of the transceiver circuit. The coupling between antenna and RF filter, on the one hand, and between RF filter and transceiver circuit, on the other hand, means that the relevant elements can be electrically connected to one another directly. Similarly, it is possible for further circuit elements, e.g., impedance matching elements, duplexers, diplexers, antenna switches or further filters, to be able to be electrically connected in appropriate signal paths between the antenna and the transceiver circuit.

Thus, a mobile communication device is obtained in which two different ports of the transceiver circuit are coupled to the antenna via one and the same RF filter. Although the bandwidth of the globally available RF frequencies for a mobile communication device communication is very large, there are overlaps between individual frequency bands of different mobile communication standards or duplexing methods. It has been recognized that the use of an RF filter for just such different signals of the same or of similar frequency decreases the complexity of the front end circuit and hence the complexity of the mobile communication device, as a result of which the number of RF filters is reduced. In addition, the number of pins required on a transceiver chip, that is to say on the chip in which at least portions of the transceiver circuit are implemented, is reduced. In addition, the complexity of a band selection switch, if present, is reduced.

The decreased number of pins, the decreased number of RF filters and the decreased complexity of a band selection switch improves the signal quality of RF signals that propagate in signal paths of the device, in principle. In this case, however, it should be borne in mind that the RF filter used twice or multiple times does not just need to comply with the specifications of a mobile communication standard and a duplexing method. Rather, partly inconsistent demands are now placed on the RF filter, which means that the filter needs to be designed particularly carefully and its physical implementation is rendered more difficult as a result of tolerances that tend to be lower.

In one embodiment, the first RF signals differ from the second RF signals in that they use different duplexing methods.

Suitable duplexing methods are frequency-based duplexing methods (e.g., FDD methods), time-based duplexing methods (e.g., TDD methods), combined time-based and frequency-based methods as used in GSM systems, code division duplexing methods, e.g., CDMA (Code Division Multiplex Access), or polarization multiplexing methods.

In one embodiment, the first and second RF signals belong to different mobile communication standards. Suitable mobile communication standards are, e.g., the standards AMPS (Advanced Mobile Phone Service), DECT (Digital Enhanced Cordless Telecommunications), GSM (Global System for Mobile communications), LTE (Long-Term Evolution), PCN (Personal Communication Network), PDC (Personal Digital Cellular), RTMS (Radio Telephone Mobile System), CT1 or CT1+ or CT2 (Cordless Telephone) or UMTS (Universal Mobile Telecommunications System), WLAN (Wireless Local Area Network), WiMAX (Worldwide Interoperability for Microwave Access) and IMT-Advanced (International Mobile Telecommunications Advanced).

In one embodiment, the first and second RF signals are transmitted in frequency bands having a common frequency, i.e., the frequency bands of the first and second RF signals overlap insofar as there is a common frequency that is both part of the frequency band of the first RF signals and part of the frequency band of the second RF signals.

Generally, the frequency bands of the first RF signals and the second RF signals are not identical, although this would be technically possible. Rather, the RF filter needs to be embodied such that both the first RF signals and the second RF signals can pass through the filter. Other, undesirable RF signals having frequency components that belong neither to the frequency band of the first RF signals nor to the frequency band of the second RF signals cannot pass through the RF filter, on the other hand. Advantageously, the RF filter is therefore a bandpass filter having a passband that comprises the frequency bands of the two RF signals.

The implementation of bandpass filters having a wide pass band is by no means trivial in this case. Since a frequency band that is meant to comprise the frequencies of both RF signals is generally wider than every single frequency band of the two RF signals, the developer of the mobile communication device faces tough technical problems because the RF filter finally also needs to comply with specifications in respect of near selection, far selection, insertion loss in the pass band and the widths of the pass band edges.

One problem with RF filters having large bandwidths are the associated quality factors. For example, the quality factor Q thus drops from approximately 900 to approximately 300 when the relative bandwidth rises from 5% to 11%. Depending on the quality factor that is required by a specification, a maximum bandwidth of 5%, 8%, 10% or 11% can therefore restrict the possible permitted combinations.

In one embodiment, the first and second RF signals are transmitted in a frequency band having a maximum relative bandwidth of 11%. In this case, the frequency band is what is known as a common frequency band that comprises the frequencies of the frequency bands of the first and second RF signals as subsets.

The relative bandwidth RB as a percentage is defined as follows in this case:

$$RB = 200 * (f_{oB} - f_{uB}) / (f_{oB} + f_{uB}),$$

where $f_{ob}$ is the frequency of the upper band edge and $f_{uB}$ is that of the lower band edge.

It has been recognized that, e.g., electroacoustically active components provide the opportunity for implementing pass bands of such width when a set of optimum operating parameters and design parameters can be found.

RF filters of simpler design for common use with first and second RF signals can also have lower relative bandwidths, however, e.g., with values of 2, 4, 6, 8 or 10%.

In one embodiment, the RF filter is selected from an SAW (Surface Acoustic Wave) filter, a BAW (Bulk Acoustic Wave) filter and a GBAW (Guided Bulk Acoustic Wave) filter.

Such RF filters use electrode structures and a piezoelectric material, with electromagnetic RF signals being converted into acoustic waves and vice versa.

In one embodiment of an electroacoustic filter of this kind, the RF filter comprises a piezoelectric material and an electrode structure on the piezoelectric material. It is also possible for a piezoelectric material to be arranged between two extensively formed electrode structures in a BAW component. The electrode structure is arranged on the piezoelectric material in such a manner, and the orientation of the piezoelectric material is chosen in such a manner, that the bandwidth of the RF filter (that is to say the "common bandwidth") is greater than the smaller of the two bandwidths of the two RF signals.

In this case, the orientation of the piezoelectric material, that is to say the orientation of the piezoelectric axes or of the axes of the elementary cells of the piezoelectric material relative to a coordinate system for the whole component and to the electrode structures, can be specified by Euler angles. A suitable choice of Euler angles allows a sufficiently large bandwidth without other electroacoustic properties being too greatly impaired.

In one embodiment, the transceiver port of the RF filter is coupled to ports of the transceiver circuit, the two or more ports of the transceiver circuit that are coupled to the filter being provided for the transmission of TX (transmitted) and/or RX (received) signals in the following bands:
  band 33 together with band 39 or
  band 33 together with band 37 together with band 39 or
  band 33 together with band 35 together with band 39 or
  band 33 together with band 35 together with band 37 or
  band 36 together with band 37 together with band 1900 or
  band 33 together with band 36 together with band 37 together with band 1900 or
  band 35 together with band 1800 or
  band 33 together with band 35 together with band 39 together with band 1800 or
  band 33 together with band 35 together with band 37 together with band 39 together with band 1800 or
  band 34 together with band 36 together with band 1900 or
  band 34 together with band 36 together with band 37 together with band 1900 or
  band 33 together with band 34 together with band 36 together with band 37 together with band 1900.

That is, it is particularly possible to use one and the same RF filter to use RF signals in band 33 as first signals and signals in band 39 as second signals (in this case the first band combination cited).

Band numbers ≥1 and ≤26 are in this case bands of an FDD system as per the following table:

| Band number | "Uplink" band (TX, MHz) | "Downlink" band (RX, MHz) | Relative bandwidth TX (%) | Relative bandwidth RX (%) |
|---|---|---|---|---|
| 1 | 1920-1980 | 2110-2170 | 3.08 | 2.80 |
| 2 | 1850-1910 | 1930-1990 | 3.19 | 3.06 |
| 3 | 1710-1785 | 1805-1880 | 4.29 | 4.07 |
| 4 | 1710-1755 | 2110-2155 | 2.06 | 2.11 |

-continued

| Band number | "Uplink" band (TX, MHz) | "Downlink" band (RX, MHz) | Relative bandwidth TX (%) | Relative bandwidth RX (%) |
|---|---|---|---|---|
| 5 | 824-849 | 869-894 | 2.99 | 2.84 |
| 6 | 830-840 | 875-885 | 1.2 | 1.14 |
| 7 | 2500-2570 | 2620-2690 | 2.76 | 2.64 |
| 8 | 880-915 | 925-960 | 3.9 | 3.71 |
| 9 | 1749.9-1784.9 | 1844.9-1879.9 | 1.98 | 1.88 |
| 10 | 1710-1770 | 2110-2170 | 3.45 | 2.8 |
| 11 | 1427-9-1447.9 | 1475.9-1495.9 | 1.39 | 1.35 |
| 12 | 699-716 | 729-746 | 2.4 | 2.31 |
| 13 | 777-787 | 746-756 | 1.28 | 1.33 |
| 14 | 788-798 | 758-768 | 1.26 | 1.31 |
| 15 | 1900-1920 | 2600-2620 | 1.05 | 0.77 |
| 16 | 2010-2025 | 2585-2600 | 0.74 | 0.58 |
| 17 | 704-716 | 734-746 | 1.69 | 1.62 |
| 18 | 815-830 | 860-875 | 1.82 | 1.73 |
| 19 | 830-845 | 875-890 | 1.79 | 1.7 |
| 20 | 832-862 | 791-821 | 3.54 | 3.72 |
| 21 | 1747.9-1462.9 | 1495.9-1510.9 | 1.03 | 1.00 |
| 22 | 3410-3490 | 3510-3590 | 2.32 | 2.25 |
| 23 | 2000-2020 | 2180-2200 | 1.00 | 0.91 |
| 24 | 1626.5-1660.5 | 1525-1559 | 2.07 | 2.20 |
| 25 | 1850-1915 | 1930-1995 | 3.45 | 3.31 |
| 26 | 814-849 | 859-894 | 4.21 | 3.99 |

Since FDD methods involve the use of different frequencies for transmitted and received signals, the relevant transmission (TX) and reception (RX) frequencies need to be specified for each band.

In pure TDD methods, the transmitted and received signals sent in different timeslots mean that the same frequencies can be used. Accordingly, the transmission and reception frequencies of bands 33 to 43 are specified in the following table:

| Band number | Uplink/Downlink band (MHz) | Relative bandwidth (%) |
|---|---|---|
| 33 | 1900-1920 | 1.05 |
| 34 | 2010-2025 | 0.74 |
| 35 | 1850-1910 | 3.19 |
| 36 | 1930-1990 | 3.06 |
| 37 | 1910-1930 | 1.04 |
| 38 | 2570-2620 | 1.93 |
| 39 | 1880-1920 | 2.11 |
| 40 | 2300-2400 | 4.26 |
| 41 | 2496-2690 | 7.48 |
| 42 | 3400-3600 | 5.71 |
| 43 | 3600-3800 | 5.41 |

In the GSM standard, transmitted and received signals are sent and received both at different frequencies and in different timeslots. Of primary relevance are the reception frequency bands, which are specified below:

| GSM band | Downlink band (MHz) | Relative bandwidth (%) |
|---|---|---|
| 850 | 869-894 | 2.84 |
| 900 | 925-960 | 3.71 |
| 1800 | 1805-1880 | 4.07 |
| 1900 | 1930-1990 | 3.06 |

If bands are close together or even overlap, it is conceivable for the relevant frequencies to be routed via one and the same RF filter in order to reduce the number of filters. Particularly the combinations specified above are summarized once again in a clear format in the following table:

| Band combination | Common uplink/downlink band (MHz) | Relative bandwidth (%) |
|---|---|---|
| 33 + 39 | 1880-1920 | 2.11 |
| 33 + 37 + 39 | 1880-1930 | 2.62 |
| 33 + 35 + 39 | 1850-1920 | 3.71 |
| 33 + 35 + 37 | 1850-1930 | 4.23 |
| 36 + 37 + 1900 | 1910-1990 | 4.10 |
| 33 + 36 + 37 + 1900 | 1900-1990 | 4.63 |
| 1800 + 35 | 1805-1910 | 5.65 |
| 33 + 35 + 39 + 1800 | 1805-1920 | 6.17 |
| 33 + 35 + 37 + 39 + 1800 | 1805-1930 | 6.69 |
| 34 + 36 + 1900 | 1930-2025 | 4.80 |
| 34 + 36 + 37 + 1900 | 1910-2225 | 5.84 |
| 34 + 33 + 36 + 37 + 1900 | 1900-2225 | 6.73 |

A method for operating one of the aforementioned exemplary embodiments of a mobile communication device is embodied such that the RF filter is operated simultaneously or successively both with first RF signals and with second signals, which are different than the first RF signals.

In other words, the first and/or second RF signals are routed simultaneously or successively, in timeslots, from the transceiver circuit to the antenna or from the antenna to the transceiver circuit through the RF filter.

The use of a single RF filter in a mobile communication device for RF signals is thus actually possible and decreases the complexity and hence the manufacturing costs of a corresponding mobile communication device. In this case, the RF signals may be associated with different multiplexing methods or different mobile communication standards.

BRIEF DESCRIPTION OF THE DRAWINGS

The invention is explained below using schematic figures and typical exemplary embodiments.

In the figures.

DETAILED DESCRIPTION OF ILLUSTRATIVE EMBODIMENTS

Figures 1, 2, 3:
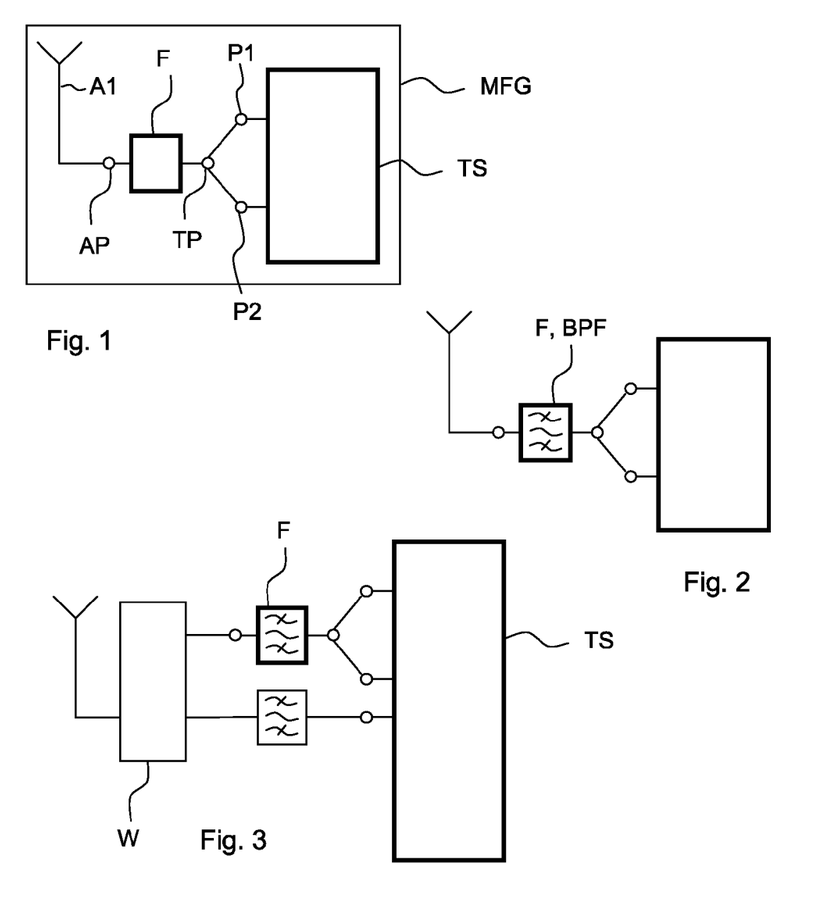
FIG. 1 shows the schematic design of a mobile communication device MFG.
FIG. 2 shows an embodiment in which the RF filter is embodied as a bandpass filter.
FIG. 3 shows an embodiment with a frequency separating filter between the filter and the antenna.

FIG. 1 schematically shows a mobile communication device MFG having an RF filter F, a transceiver circuit TS and ports by means of which the filter and the transceiver circuit are coupled. In particular, the mobile communication device has an antenna port AP and a transceiver port TP. The RF filter F is coupled to an antenna by means of the antenna port. By means of its transceiver port, the RF filter F is coupled to the ports of the transceiver circuit TS. In particular, the transceiver circuit comprises a first port P1 and a second port P2, by means of which ports the transceiver port of the filter is coupled to the transceiver circuit. The embodiment shown in FIG. 1 shows the filter electrically connected to the antenna and the transceiver circuit directly. Further circuit elements may alternatively be electrically connected between the antenna and the transceiver circuit in order to make impedance matches or to perform further filter functions.

FIG. 2 shows an embodiment in which the RF filter F is embodied as a bandpass filter BPF. The bandpass filter BPF then preferably has a pass band that is embodied such that frequencies of the first RF signals and of the second RF signals can pass.

FIG. 3 shows an embodiment in which a frequency separating filter W is electrically connected between the RF filter F and the antenna. The frequency separating filter W can therefore be used to couple different signal paths to the same antenna. In this case, the frequency separating filter W may be embodied as a diplexer, as a duplexer or as a band selection filter. In a further signal path, the mobile communication device comprises a further bandpass filter, which is connected in parallel with the RF filter F and allows the transmission of transmitted or received signals between antenna and transceiver circuit.

Figure 4:
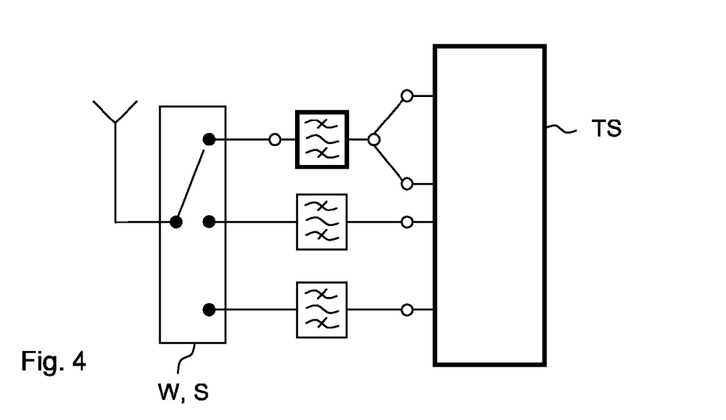
FIG. 4 shows an embodiment with further signal paths and a band selection switch.

FIG. 4 shows an embodiment in which the frequency separating filter W is embodied as a band selection switch S that can be used to connect up the antenna either to one of three or, more generally, to one of multiple parallel signal paths from the antenna to the transceiver circuit TS.

Figure 5:
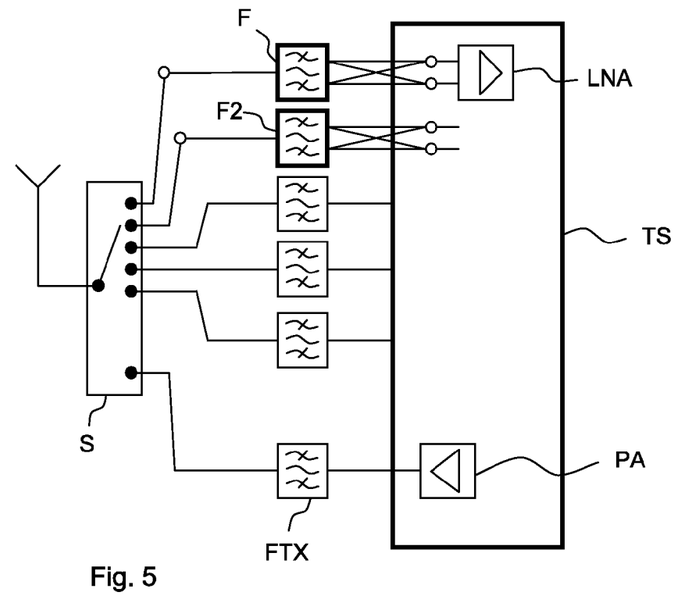
FIG. 5 shows an embodiment with a multiplicity of signal paths.

FIG. 5 shows an embodiment in which the RF filter F is electrically connected to appropriate ports of a low noise amplifier LNA by means of balanced signal lines. In principle, unbalanced signal lines are suitable, in which an RF signal is conducted with respect to a reference ground potential. Balanced signal lines have two parallel line sections, with each line section carrying an RF signal having a phase offset of 180° relative to the other line signal. Such a balanced signal line is thus less sensitive toward common mode interference.

Besides the RF filter F mentioned hitherto, the mobile communication device can comprise further RF filters F2 that serve for common use with different RF signals of a first and a second type.

In addition, the mobile communication device can comprise a multiplicity of further filters in parallel signal paths and hence be in control of a multiplicity of transmission standards and duplexing methods.

Figure 6:
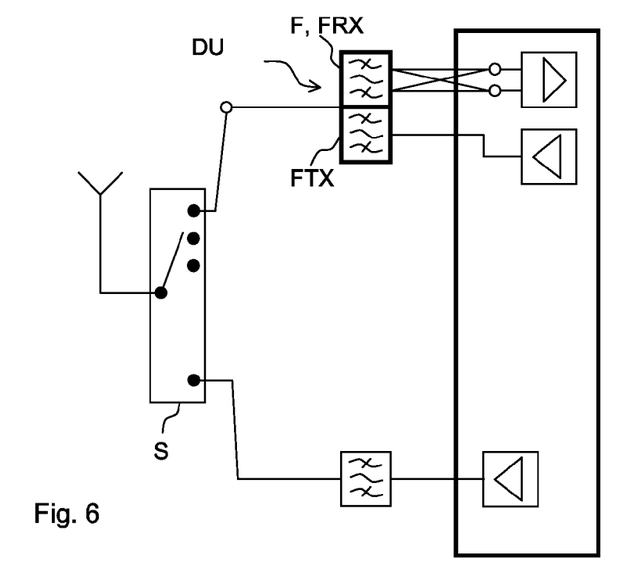
FIG. 6 shows an embodiment in which the RF filter is part of a duplexer.

FIG. 6 shows an embodiment in which the RF filter F is embodied as a transmission filter FTX of a duplexer DU. Via this reception filter FRX, it is possible for, e.g., signals in the FDD band 2 and also GSM 1900 received signals and signals in the TDD band 36 to propagate.

Figure 7:
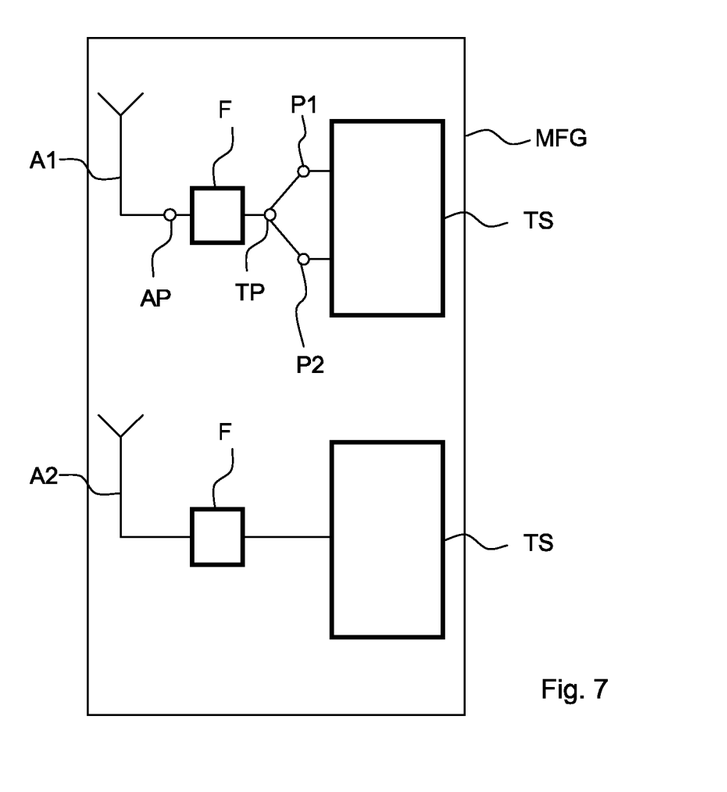
FIG. 7 shows an embodiment of a mobile communication device with two antennas.

FIG. 7 shows an embodiment in which the mobile communication device MFG comprises not only the antenna A1 but also a further antenna A2 so that, by way of example, RF signals in additional frequency bands, e.g., at 2.7 GHz, can be sent and received. The common use of an RF filter F is not subject to interference from further antennas, further signal paths and further filters and transceiver circuits and segments of a common transceiver circuit in this case. The use of different duplexing methods or different transmission standards for different frequency bands is compatible with other standard circuit elements of a mobile communication device, which means that the effort for matching to other filters, if need be as far as impedance matches, remains low.

Figure 8:
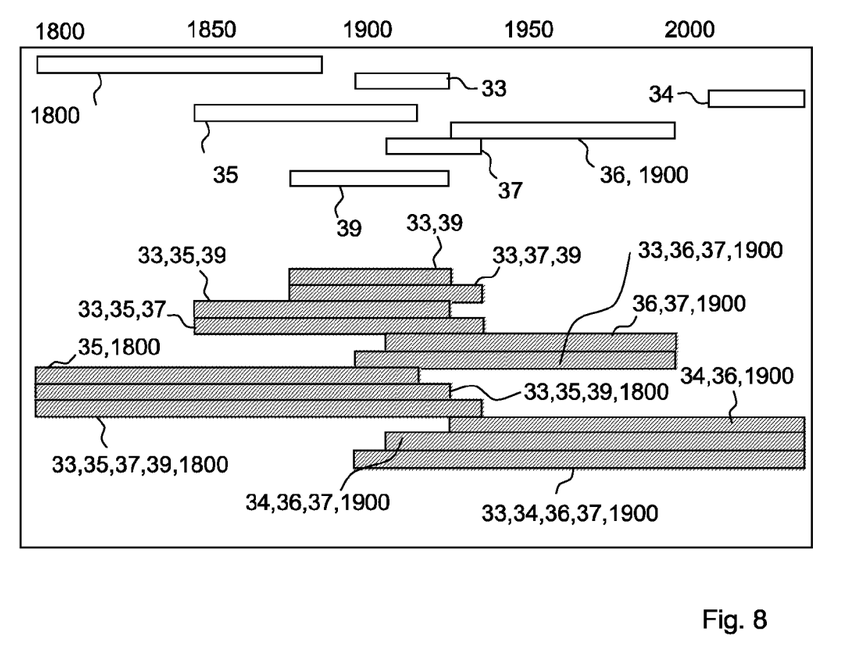
FIG. 8 shows the arrangement of adjacent frequency ranges relative to one another and also correspondingly extended frequency bands that comprise a plurality of conventional frequency bands.

FIG. 8 shows the relative situation of typical TDD and/or GSM frequency bands. The frequency range of the frequency bands denoted by shading comprises two or more typical frequency bands. The reference symbols associated with the respective combined frequency band denote these very frequency bands. FIG. 8 is therefore the graphical representation of the band combinations presented in the table shown above.

The invention claimed is:

1. A mobile communication device comprising:
an antenna;
a transceiver circuit having a first port for transmitting first radio-frequency (RF) signals and a second port for transmitting second RF signals, the second RF signals being different than the first RF signals; and
a single RF filter electrically connected between the antenna and the transceiver circuit, the RF filter having an antenna port coupled to the antenna, and a transceiver port coupled to the transceiver circuit, wherein the transceiver port of the RF filter is coupled to the first port and to the second port of the transceiver circuit.

2. The mobile communication device of claim 1, wherein the first RF signals and the second RF signals use different duplexing methods.

3. The mobile communication device of claim 1, wherein the first RF signals and the second RF signals belong to different mobile communication standards.

4. The mobile communication device of claim 1, wherein a frequency band of the first RF signals overlaps a frequency band of the second RF signals.

5. The mobile communication device of claim 1, wherein the first RF signals and the second RF signals are transmitted in a frequency band having a maximum relative bandwidth of 11%.

6. The mobile communication device of claim 1, wherein the RF filter is a surface acoustic wave (SAW) filter, a bulk acoustic wave (BAW) filter or a guided bulk acoustic wave (GBAW) filter.

7. The mobile communication device of claim 1, wherein the RF filter comprises:
a piezoelectric material; and
an electrode structure on the piezoelectric material.

8. The mobile communication device of claim 7, wherein the electrode structure is arranged on the piezoelectric material in such a manner, and an orientation of the piezoelectric material is chosen in such a manner, that a bandwidth of the RF filter is greater than a smaller of a bandwidth of the first RF signal and a bandwidth of the second RF signal.

9. The mobile communication device of claim 1, wherein the transceiver port of the RF filter is coupled to ports of the transceiver circuit that are provided for transmitting and/or receiving signals in the bands
band 33 together with band 39, or
band 33 together with band 37 together with band 39, or
band 33 together with band 35 together with band 39, or
band 33 together with band 35 together with band 37, or
band 36 together with band 37 together with band 1900, or
band 33 together with band 36 together with band 37 together with band 1900 or
band 35 together with band 1800, or
band 33 together with band 35 together with band 39 together with band 1800, or
band 33 together with band 35 together with band 37 together with band 39 together with band 1800, or
band 34 together with band 36 together with band 1900, or band 34 together with band 36 together with band 37 together with band 1900, or band 33 together with band 34 together with band 36 together with band 37 together with band 1900.

10. The mobile communication device of claim 1, wherein the RF filter is a band-pass filter.

11. A method of operating the mobile communication device of claim 1, wherein the RF filter is operated simultaneously or successively both with the first RF signals and with the second RF signals.

12. The mobile communication device of claim 1, wherein the single RF filter has a passband to pass both a frequency band of the first RF signal and a frequency band of the second RF signal.

13. A method of operating a mobile communication device, the method comprising:
    receiving a first radio-frequency (RF) signal at an antenna, the first RF signal from a first multiplexing method or from a first communication standard;
    filtering the first RF signal using an RF filter;
    providing the filtered first RF signal to a transceiver circuit;
    receiving a second RF signal at the antenna, the second RF signal from a second multiplexing method that is different than the first multiplexing method or from a second communication standard that is different than the first communication standard, wherein the first RF signal is from the first multiplexing method and the second RF signal is from the second multiplexing standard or wherein the first RF signal is from the first communication standard and the second RF signal is from the second communication standard;
    filtering the second RF signal using the RF filter; and
    providing the filtered second RF signal to the transceiver circuit.

14. The method according to claim 13, wherein the first RF signal is from the first multiplexing method and the second RF signal is from the second multiplexing standard and wherein the first RF signal is from the first communication standard and the second RF signal is from the second communication standard.

15. The method according to claim 13, wherein the first RF signal and the second RF signal are received simultaneously.

16. The method according to claim 13, wherein the first RF signal and the second RF signal are received sequentially.

17. The method according to claim 13, wherein the first RF signal and the second RF signal are transmitted in frequency bands having a common frequency.

18. A mobile communication device comprising:
    an antenna;
    a transceiver circuit having a first port for transmitting first radio-frequency (RF) signals and a second port for transmitting second RF signals, which are different than the first RF signals; and
    a single RF filter electrically connected between the antenna and the transceiver circuit, the RF filter having an antenna port coupled to the antenna, and a transceiver port coupled to the transceiver circuit, wherein:
        the transceiver port of the RF filter is coupled to the first port and to the second port of the transceiver circuit;
        the first and second RF signals use different duplexing methods; and
        the first and second RF signals belong to different mobile communication standards.

19. The mobile communication device of claim 18, wherein the RF filter comprises:
    a piezoelectric material; and
    an electrode structure on the piezoelectric material.

20. The mobile communication device of claim 19, wherein the electrode structure is arranged on the piezoelectric material in such a manner, and an orientation of the piezoelectric material is chosen in such a manner, that a bandwidth of the RF filter is greater than a smaller of a bandwidth of the first RF signal and a bandwidth of the second RF signal.

* * * * *